No. 763,084. Patented June 21, 1904.

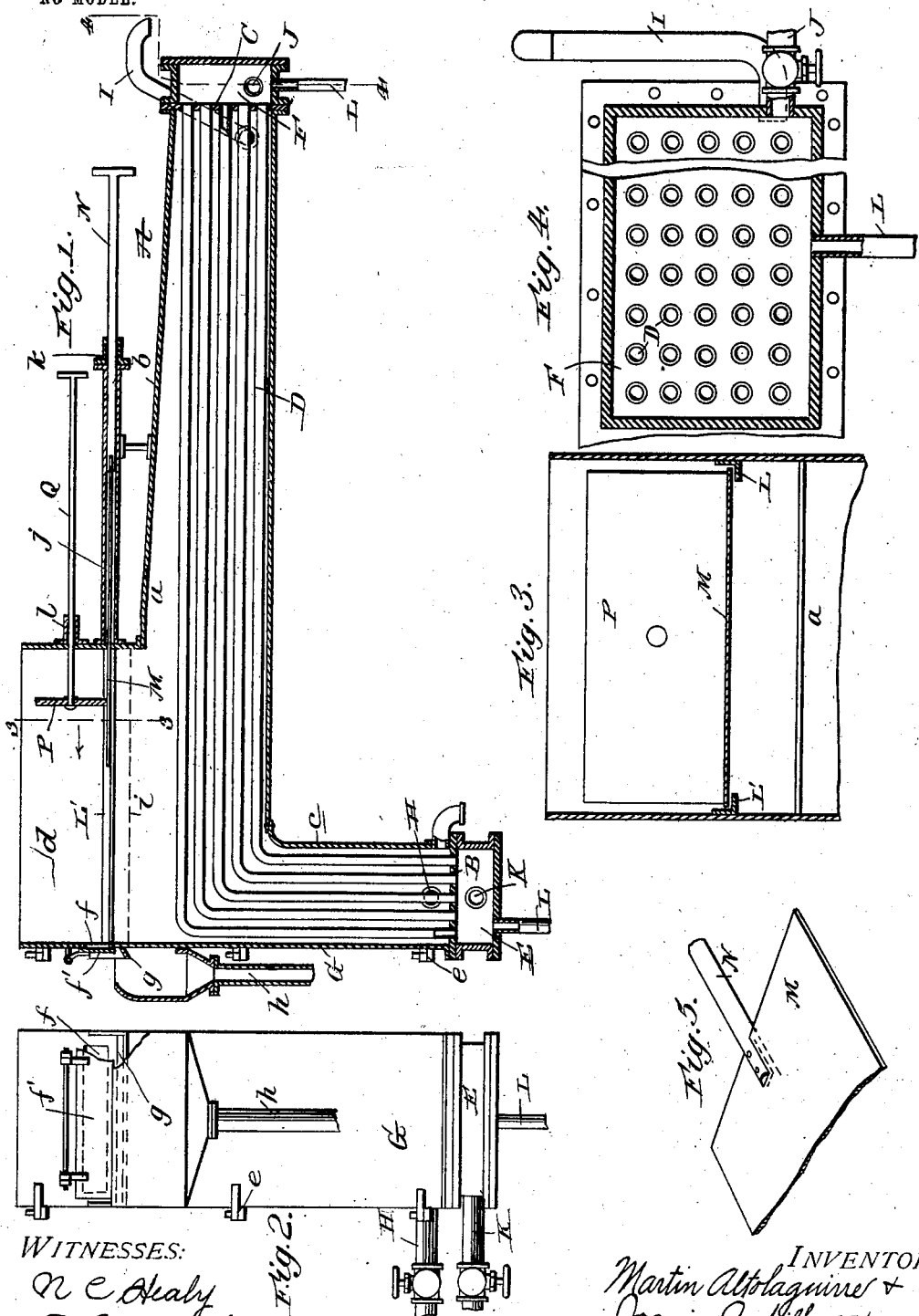

UNITED STATES PATENT OFFICE.

MARTIN ALTOLAGUIRRE AND JOAQUIN ZUBILLAGA, OF ARTEMISA, CUBA.

DEFECATING APPARATUS.

SPECIFICATION forming part of Letters Patent No. 763,084, dated June 21, 1904.

Application filed April 5, 1904. Serial No. 201,675. (No model.)

*To all whom it may concern:*

Be it known that we, MARTIN ALTOLAGUIRRE and JOAQUIN ZUBILLAGA, citizens of the United States, residing at Ingenio "El Pilar," Artemisa, Cuba, have invented new and useful Improvements in Defecating Apparatus, of which the following is a specification.

Our invention pertains to defecating, and has for one its objects to provide a defecating apparatus which is simple, inexpensive, and sturdy in construction and yet continuous in operation and possessed of high capacity.

Another object of the invention is the provision, in a defecating apparatus, of means whereby scum may be expeditiously removed from the juice without interruption of the defecating operation.

Another object is the provision of a defecating apparatus constructed with a view of causing the collection of scum at a particular point, this with a view of facilitating the removal of the scum from the juice.

With the foregoing in mind the invention will be fully understood from the following description and claims when taken in connection with the accompanying drawings, forming part of this specification, in which—

Figure 1 is a longitudinal vertical section of the apparatus constituting the preferred embodiment of our invention; Fig. 2, a front elevation of the apparatus, with parts broken; Fig. 3, a detail transverse section, on an enlarged scale, taken in the plane indicated by the line 3 3 of Fig. 1; Fig. 4, an enlarged broken transverse section taken in the plane indicated by the line 4 4 of Fig. 1, and Fig. 5 a broken perspective view of the plate for separating the juice and the scum precedent to the discharge of the latter from the apparatus.

Similar letters designate corresponding parts in all of the views of the drawings, referring to which—

A is the casing of the apparatus. This casing is preferably of sheet metal and comprises a horizontal portion $a$, the upper wall $b$ of which is inclined in the direction of its length for a purpose presently set forth, a leg $c$, depending from one end of the portion $a$, and a frame $d$, preferably rectangular, communicating with and extending upwardly from the same end of the portion $a$ and open at its upper end.

B is a head fixed in the lower end of the leg $c$ of the casing; C, a head fixed in the end of the casing portion $a$ remote from the leg $c$; D D, tubes, preferably of copper, fixed at their ends in the heads B C and disposed in the portion $a$ and the leg $c$ of the casing; E, a chamber, preferably of cast metal, connected to the lower end of the casing-leg $c$ and communicating with the lower ends of the tubes D; F, a chamber, also preferably formed of cast metal and communicating with the upper ends of the tubes D, and G the forward end wall of the casing. The said wall G is hinged at $e$ to the side wall of the casing portion $a$, leg $c$, and frame $d$ and is provided with an opening $f$, a spout $g$, disposed below said opening, and a conduit $h$, arranged to receive from the spout and having for its purpose to convey scum to any desired point. In virtue of the said wall G being hinged as described it is adapted to be readily opened, so as to afford access to the tubes D and the interior of the casing A for the purpose of repairing or cleaning the apparatus.

H is a valved pipe connected with the lower portion of the casing-leg $c$ and adapted to supply the same with cold juice or saccharine solution; I, a pipe leading from the end of the portion $a$ remote from the leg $c$ and having a gooseneck disposed in about the horizontal plane shown in Fig. 1; J, a valved pipe communicating with the chamber F and designed to supply the same with live steam; K, a pipe communicating with the chamber E and designed to supply the same with exhaust or low-pressure steam, and L L pipes leading from the chambers E F and having for their purpose to conduct water of condensation from the said chambers back to a boiler or to any other desired point.

In the practical operation of the apparatus the valve in the pipe H is opened and cold juice or saccharine solution is permitted to flow into the casing A until it reaches the level indicated by the dotted line $i$ in Fig. 1. With this done the valve in said pipe is closed and live and exhaust steam is let into the chambers F and D, respectively, until the juice in the casing is brought to a heat of 100° centigrade. The valve in the pipe I is then opened and the discharge of the clarified juice through the said pipe I then takes place. This operation is continued indefinitely and at intervals of about thirty minutes. Scum is removed from the juice in the frame *d* by means presently described.

In virtue of live or superheated steam being supplied to one end of the casing A and exhaust or low-pressure steam to the other end thereof there is a marked difference of temperature in the ends or extremes of the apparatus which produces circulation of the saccharine solution in the casing. Such difference of temperature also gives rise to the circulation of air in the casing, and the inclined upper wall of the casing portion *a* facilitates the escape of air and guides the current of solution toward the frame *d*, with the result that the accumulation of scum in said frame *d* is materially accelerated.

L L, Fig. 3, are angle-irons fixed to the side walls of the frame *d* in about the same horizontal plane as the opening *f* in wall G. M is a plate movable on said angle-irons and in a housing *j*, connected to and extending rearwardly from the rear wall of the frame *d*; N, a rod connected to the plate M and extending through a stuffing-box *k* at the rear end of the housing *j*; P, a follower disposed in the frame *d* above the horizontal plane of the plate M, and Q a handle-rod connected to said follower and extending rearwardly through a stuffing-box *l* on the rear wall of the frame *d*.

When during the continuous operation of the apparatus scum accumulates in the frame *d* to a height of, say, twelve inches, the plate M is moved, through the medium of the handle-rod N, in the direction of the arrow in Fig. 1 until its forward end brings up against the forward end wall of the frame *d*—this to separate the comparatively dry scum from the clear juice or saccharine solution. With this done, the follower P is moved from its normal position at the inner side of the rear wall of frame *d* forwardly, or in the direction of the arrow, and the scum is moved before said follower and discharged, through the opening *f* in wall G, into the conduit or launder *h*. The opening *f* in wall G is normally closed by a gravitating gate *f'*, which opens under the pressure of the scum and after the discharge of the latter resumes its normal position. The scum may be conveyed to any desired point and disposed of in any suitable way. We prefer, however, to mix the scum with equal volumes of water and to boil and decant the mixture, since the same has approximately 1.5° to 2° Baumé and is excellent for saturation between mills.

The defecating operation is not interrupted or otherwise affected by the removal of the scum in the manner described, and all the attendant has to do in order to reëstablish the accumulation of scum in the frame *d* is to return the plate M and the follower P to their normal positions, so as to render the frame *d* entirely open to the interior of the casing.

Because of the casing A having the horizontal portion *a*, the upper wall of which is inclined, and a leg *c*, depending from one end of said portion *a*, it will be observed that the ascending currents will meet at right angles to each other at a point below the frame *d*, and in consequence the portion of the juice adjacent to said frame will be kept highly heated. This is an important advantage, since it is essential to the proper separation of scum from the clear juice that the solution be kept constantly at or about 100° centigrade when adjacent to the frame *d*.

We prefer in practice to connect the discharge-pipe I to the lower portion of the casing portion *a* and to make said pipe of about the same diameter as or slightly larger than the pipe H.

Notwithstanding the advantages of our novel apparatus as pointed out in the foregoing it will be observed that the apparatus is simple, compact, and sturdy in construction and embodies no delicate parts, such as are likely to be affected by the high heat and get out of order after a short period of use.

We have entered into a detailed description of the construction and relative arrangement of parts embraced in the present and preferred embodiment of our invention in order to impart a full, clear, and exact understanding of the same. We do not desire, however, to be understood as confining ourselves to such specific construction and relative arrangement of parts, as such changes or modifications may be made in practice as fairly fall within the scope of our invention as claimed.

Having described our invention, what we claim, and desire to secure by Letters Patent, is—

1. A defecating apparatus comprising a casing having a horizontal portion a leg depending from said horizontal portion and an opening above the leg, and one or more tubes arranged in the horizontal portion and the leg of the casing, and adapted to conduct a heating agent therethrough.

2. A defecating apparatus comprising a casing having a horizontal portion a leg depending from said horizontal portion and an opening above the leg, and also having the upper wall of the horizontal portion inclined downwardly from the opening, and one or more tubes arranged in the horizontal portion and the leg of the casing, and adapted to conduct a heating agent therethrough.

3. A defecating apparatus comprising a casing having a horizontal portion a leg depending from said horizontal portion and an opening above the leg, a chamber at the lower end of the leg adapted to be supplied with exhaust-steam, a chamber at the end of the horizontal portion remote from the leg, adapted to be supplied with live steam, and one or more tubes extending through the horizontal portion and the leg of the casing, and connecting the chambers.

4. A defecating apparatus comprising a casing having a horizontal portion a leg depending from said horizontal portion and an opening above the leg, and also having the upper wall of the horizontal portion inclined downwardly from the opening, a chamber at the lower end of the leg adapted to be connected with a source of exhaust-steam supply, a chamber at the end of the horizontal portion remote from the leg adapted to be connected with a source of live-steam supply, and one or more tubes extending through the horizontal portion and the leg of the casing, and connecting the chambers.

5. A defecating apparatus comprising a casing having an opening and portions meeting below said opening and disposed at right angles to each other and means for heating juice extending through said portions of the casing.

6. A defecating apparatus comprising a casing having a horizontal portion a leg depending from said horizontal portion and an opening above the leg, and also having a wall forming part of the leg, and one wall of the opening, and adapted to be opened to afford access to the interior of the casing, and one or more tubes arranged in the horizontal portion and the leg of the casing, and adapted to conduct a heating agent therethrough.

7. A defecating apparatus comprising a casing having an opening, a movable plate for closing said opening so as to separate scum from clear juice, and means for removing the scum so separated from the casing.

8. A defecating apparatus comprising a casing having a frame forming an opening, a movable plate arranged to close said opening so as to separate scum from clear juice, and a follower movable above the plate for discharging scum from the casing.

9. A defecating apparatus comprising a casing having a frame forming an opening; said frame being provided in one of its walls with an opening for the passage of scum, movable means for separating scum from clear juice, and movable means for forcing the scum through the opening in the wall of the frame.

10. A defecating apparatus comprising a casing having a frame forming an opening, said frame having an opening in one of its walls, a slide-plate for closing said opening, and thereby separating scum from clear juice, and a follower movable in the frame, above the slide-plate, and adapted to force scum through the opening in the wall of the frame.

11. A defecating apparatus comprising a casing having a frame forming an opening, said frame having an opening in one of its walls, a self-closing, outwardly-opening gate controlling said opening in the wall of the frame, means for separating scum from clear juice, and means for forcing the scum so separated through the opening in the wall of the frame and past the gate.

12. In a defecating apparatus, the combination of a casing having an opening, and portions extending from said opening and disposed at right angles to each other, means for heating juice contained in the casing, a slide-plate adapted to close the opening of the casing, and having a handle-rod extending outside the same, and a follower movable in the casing, above the slide-plate, and also having a handle extending outside the casing.

13. The combination in a defecating apparatus with a casing having a frame forming an opening, portions extending from said frame and disposed at right angles to each other, a housing extending from one wall of the frame, and an opening in the opposite wall of the frame and a self-closing door for normally closing said opening; of means for heating juice in the casing, a slide-plate guided in the frame and the housing thereof, and having a handle-rod extending outside the housing, and a follower movable in the frame, above the slide-plate, and also having a handle-rod extending outside the casing.

14. A defecating apparatus comprising a casing having an opening in its top, and a horizontal portion and a leg extending from said opening, and also having the upper wall of the horizontal portion inclined downwardly from the opening, and means for heating saccharine solution in the casing.

15. In a defecating apparatus, the combination of a casing having a frame forming an opening, a hinged wall forming one wall of the casing and frame, and having an opening, a self-closing door for normally closing said opening, and a conduit or launder arranged to receive from the opening, means for heating saccharine solution in the casing, means for closing the opening in the top of the casing so as to separate scum from clear solution, and means for forcing the scum so separated through the opening in the hinged wall, and past the door.

In testimony whereof we have hereunto set our hands in presence of two subscribing witnesses.

MARTIN ALTOLAGUIRRE.
JOAQUIN ZUBILLAGA.

Witnesses:
  VICENTE GOICOECHEA,
  GUMERSINDO RENOVALES.